US012607614B2

(12) United States Patent
Liu et al.

(10) Patent No.: US 12,607,614 B2
(45) Date of Patent: Apr. 21, 2026

(54) DETECTION METHOD OF WORMLIKE MICELLES

(71) Applicant: Beijing Technology and Business University, Beijing (CN)

(72) Inventors: Changyao Liu, Beijing (CN); Kaixin Yao, Beijing (CN); Lijie Sun, Beijing (CN); Jiani Gong, Beijing (CN); Baocai Xu, Beijing (CN); Yawen Zhou, Beijing (CN); Guiju Zhang, Beijing (CN); Hongqin Liu, Beijing (CN); Li Zhao, Beijing (CN); Ce Wang, Beijing (CN)

(73) Assignee: BEIJING TECHNOLOGY AND BUSINESS UNIVERSITY, Beijing (CN)

( * ) Notice: Subject to any disclaimer, the term of this patent is extended or adjusted under 35 U.S.C. 154(b) by 904 days.

(21) Appl. No.: 17/895,379

(22) Filed: Aug. 25, 2022

(65) Prior Publication Data

US 2023/0088675 A1 Mar. 23, 2023

(30) Foreign Application Priority Data

Aug. 27, 2021 (CN) ........................ 202110995888.7

(51) Int. Cl.
*G01N 31/00* (2006.01)
*G01N 31/22* (2006.01)

(52) U.S. Cl.
CPC .................................. *G01N 31/22* (2013.01)

(58) Field of Classification Search
CPC .................................................... G01N 31/22
USPC ........................................................ 436/161
See application file for complete search history.

(56) References Cited

PUBLICATIONS

Liu et al. "Effects of interfacial specific cations and water molarities on AOT micelle-to-vesicle transitions by chemical trapping: the specific ion-pair/ hydration model" Phys. Chem.Chem.Phys., 2019, 21, 8633 (Year: 2019).*

* cited by examiner

*Primary Examiner* — Lyle Alexander
*Assistant Examiner* — Emily R. Berkeley

(57) ABSTRACT

The present disclosure provides a detection method of wormlike micelles, and belongs to the technical field of analytical chemistry. In the present disclosure, z-$ArN_2^+$ is used as a chemical probe substance; a long-chain probe is added to a test solution for probing an interfacial region, and a short-chain probe is added to a surfactant-free control solution. A selectivity of the probe with different nucleophiles is determined by the above method, and a yield of an obtained product is measured by high-performance liquid chromatography (HPLC); and the wormlike micelles are detected by measuring the yield of the product using the selectivity of the short-chain probe to be converted into an interfacial mole number. The wormlike micelles are detected by chemical probes, and the chemical probes have a simple preparation method, a low cost, real-time detection, and broad prospects for use.

4 Claims, 2 Drawing Sheets

DETECTION METHOD OF WORMLIKE MICELLES

CROSS REFERENCE TO RELATED APPLICATION

This patent application claims the benefit and priority of Chinese Patent Application No. 202110995888.7, filed on Aug. 27, 2021, the disclosure of which is incorporated by reference herein in its entirety as part of the present application.

TECHNICAL FIELD

The present disclosure relates to the technical field of analytical chemistry, in particular to a detection method of wormlike micelles.

BACKGROUND ART

Wormlike micelles are one of the association structures of amphiphiles in an aqueous solution, also known as thread-like micelles and giant micelles. The wormlike micelles have a molecular packing parameter P of ½ to ⅓, a diameter of generally 1 nm to 10 nm, and a length of $10^1$ nm and $10^4$ nm. The length of the wormlike micelles is related to the structure and concentration of a surfactant, as well as the temperature, salinity, and counterions in aqueous solutions. The steric hindrance of the wormlike micelles inhibits the free rotation of the solution, such that wormlike micelle solutions appear as a viscoelastic fluid with unique rheological properties.

During formation of the wormlike micelles, repulsion between a water environment and hydrophobic chains of the surfactant leads to intermolecular self-assembly into spherical micelles; if a concentration of the surfactant continues to increase, the micelles can "grow" and become longer, forming short rod-like micelles. Whereas, under certain entropy conditions, the generation of two hemispherical end caps from a semi-infinite cylinder (by fracture) requires very large amounts of energy, such that the short rod-like micelles may elongate along a one-dimensional and non-axial direction under certain conditions, self-assembling into the wormlike micelles. When the surfactant concentration reaches a critical entanglement concentration (C*), the flexible wormlike micelles are superimposed on each other to form a dynamic three-dimensional network structure, and the network structure is in a balance of destruction and reorganization, which is similar to flexible polymers. Therefore, the wormlike micelles are also called "living" polymers. The viscoelastic properties, aggregated structure, and microscopic morphology of the wormlike micelles are mainly characterized by rotational rheometer, small-angle neutron scattering (SANS), nuclear magnetic resonance (NMR), dynamic light scattering (DLS), and cryo-TEM.

In the prior art, the presence of wormlike micelles is generally detected using the rheometer or the cryogenic transmission electron microscope (cryo-TEM), which has expensive detection instruments, resulting in inconvenient detection and high cost.

SUMMARY

In view of this, the present disclosure provides a detection method of wormlike micelles. The method can detect the wormlike micelles using chemical probes, with convenient use and a low cost.

The present disclosure provides a detection method of wormlike micelles, where the detection method is implemented by a z-$ArN_2^+$ long-chain probe and a z-$ArN_2^+$ short-chain probe, and the z-$ArN_2^+$ has a structure shown in Formula I:

Formula I

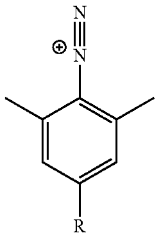

z-$ArN_2^+$ in the z-$ArN_2^+$ short-chain probe, z=1, and R is —$CH_3$; and in the z-$ArN_2^+$ long-chain probe, z=16, and R is —$C_{16}H_{33}$.

Preferably, the detection method of wormlike micelles may include the following steps:

(1) preparing the long-chain probe into an acetonitrile stock solution with a concentration of 0.005 M to 0.05 M, and preparing the short-chain probe into an acetonitrile stock solution with a concentration of 0.05 M to 0.5 M;

(2) adding a surfactant to a volumetric flask, dissolving and diluting with a diluent, and adding the stock solution of the long-chain probe obtained in step (1) to obtain a test solution; where the test solution has $5\times10^{-4}$ M to $5\times10^{-5}$ M of the long-chain probe and $1\times10^{-3}$ M to 2 M of the surfactant by concentration;

(3) replacing the surfactant in step (2) with an ammonium salt or a sulfonate, dissolving and diluting with the diluent, and adding the stock solution of the short-chain probe obtained in step (1) to obtain a control solution; where the control solution has $5\times10^{-3}$ M to $5\times10^{-4}$ M of the short-chain probe by concentration;

(4) conducting a reaction on the test solution obtained in step (2) at 25° C. to 60° C. for 5 h to 48 h under sealing in the dark, diluting an obtained reaction product with the diluent, and measuring a yield of the product by high-performance liquid chromatography (HPLC);

(5) repeating the operations of step (4) on the control solution obtained in step (3); and (6) obtaining the yield of the product measured by the HPLC from an average of peak areas of three or more repeated injections and calibration curves of cetyldimethylphenol and cetyldimethylbromobenzene.

Preferably, in step (2), the surfactant may be cetyltrimethylammonium bromide (CTAB).

Preferably, in steps (2) to (4), the diluent may be at least one selected from the group consisting of methanol, acetonitrile, and water.

Preferably, in step (3), the ammonium salt may be at least one selected from the group consisting of tetramethylammonium salt and tetraethylammonium salt, and the sulfonate may be methylsulfonate.

Preferably, in steps (4) and (6), the HPLC may be conducted by a C18 chromatographic column with a length of 25 cm and using 65% methanol: 35% isopropanol (v/v) as a mobile phase at a flow rate of 0.4 mL/min, a λ of 220 nm, and an injection volume of 100 μL.

The long-chain probe and the short-chain probe compete with water molecules, alcohols and bromide ions to generate dediazoniation products z-ArOH, z-ArX, and z-ArOR', where R' represents a length of an alcohol chain and z-$ArN_2^+$ represents two amphipathic probes. A reaction of the z-$ArN_2^+$ with a weakly-basic nucleophile in a micelle solution and a reference solution is as follows:

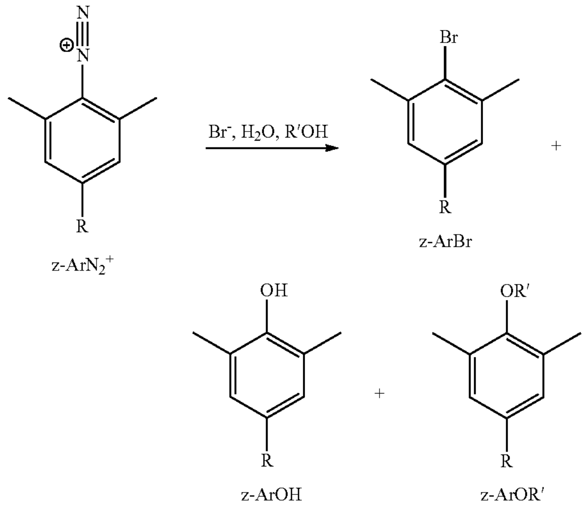

z-$ArN_2^+$ z-ArBr z-ArOH z-ArOR' z = 1, R = R' = $CH_3$; z = 16, R = $C_{16}H_{33}$, R' = $C_4H_9$ or $C_8H_{17}$ or $C_{10}H_{21}$

A chemical trapping method is based on the chemical probes. The long-chain probe is added to the micelle solution for probing an interfacial region, and the short-chain probe is added to a reference solution of a surfactant-free aqueous solution; a selectivity of the probe with different nucleophiles is determined by the above method, and a product yield obtained in the surfactant is determined by HPLC; and whether the wormlike micelles are formed can be determined by measuring the yield of the product using the selectivity of the short-chain probe to be converted into an interfacial molarity.

Compared with the prior art, the present disclosure has the following beneficial effects: the detection method of wormlike micelles has a simple operation, avoids expensive detection instruments, and realizes real-time detection, which has broad prospects for use.

DETAILED DESCRIPTION OF THE EMBODIMENTS

The present disclosure is further described below with reference to examples. In the following examples, the experimental methods or test methods, unless otherwise specified, are conventional methods; the raw materials and auxiliary agents, unless otherwise specified, are obtained from conventional commercial channels, or prepared by conventional methods.

Example 1

(1) A long-chain probe 16-$ArN_2BF_4$ was prepared into a stock solution with a concentration of 0.01 M, and placed in acetonitrile for later use; 2 ml of a 0.1 M CTAB/0.05 M KBr/5 mM to 300 mM cinnamyl alcohol system was prepared for later use; 20 □μL of the long-chain probe 16-$ArN_2BF_4$ stock solution ice-encapsulated in the acetonitrile was added to 2 L of the 0.1 M CTAB/0.05 M KBr/5 mM to 300 mM cinnamyl alcohol system, to obtain a solution with a concentration of $1.2\times10^{-5}$ M to $2\times10^{-4}$ M; the above solution was mixed well, placed in a dark and sealed environment, and reacted at 25° C. for 48 h; a reaction product was diluted with methanol, and then measured by HPLC. The HPLC was conducted by a C18 chromatographic column with a length of 25 cm and using 65% methanol: 35% isopropanol (v/v) as a mobile phase at a flow rate of 0.4 mL/min, a $\lambda$ of 220 nm, and an injection volume of 100 μL.

The yield of the product was obtained from an average of peak areas of three or more repeated injections and calibration curves of cetyldimethylphenol and cetyldimethylbromobenzene.

(2) The long-chain probe 16-$ArN_2BF_4$ in step (1) was replaced with a short-chain probe 1-$ArN_2BF_4$, and the 0.1 M CTAB/0.05 M KBr/5 mM to 300 mM cinnamyl alcohol system in step (1) was replaced with an aqueous methanol system of 0.01 M to 3 M tetramethylammonium bromide (TMAB), and other operations were the same as those in step (1).

Example 2

The cinnamyl alcohol in Example 1 was replaced with benzyl alcohol, and other operations were the same as those in Example 1.

Example 3

The cinnamyl alcohol in Example 1 was replaced with phenethyl alcohol, and other operations were the same as those in Example 1.

Example 4

The cinnamyl alcohol in Example 1 was replaced with anisyl alcohol, and other operations were the same as those in Example 1.

Figure 1:
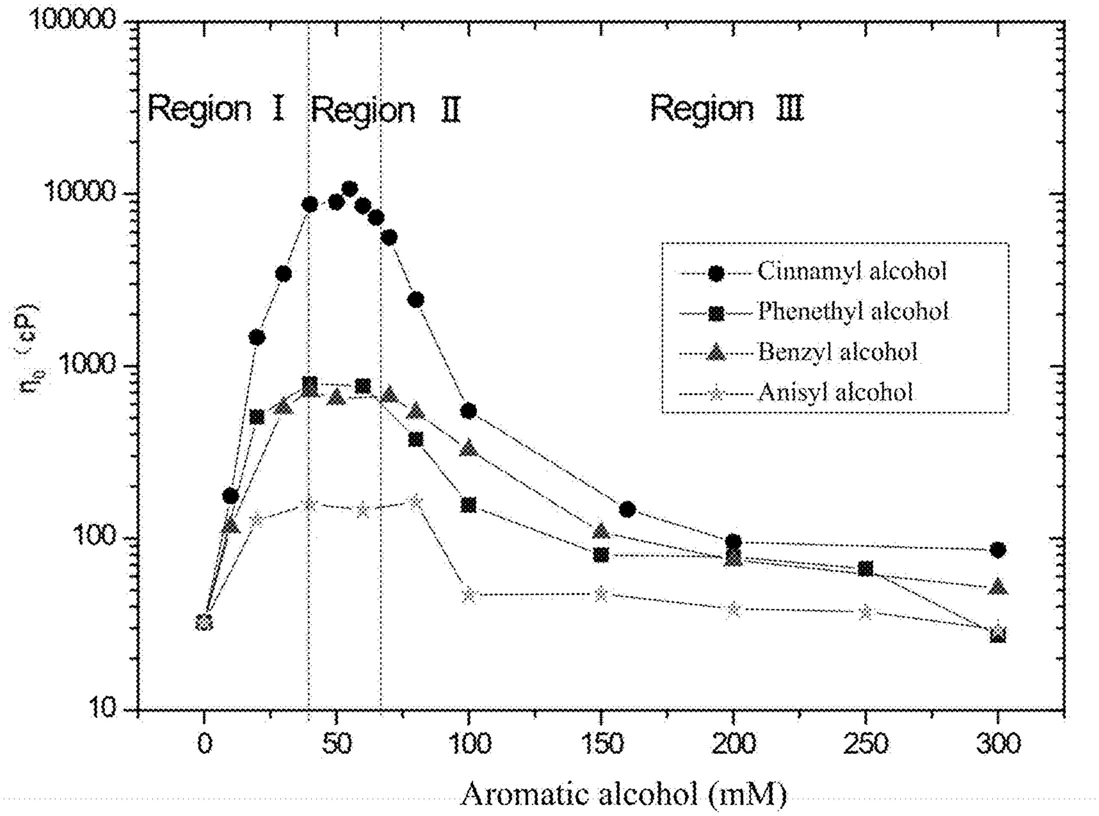
FIG. 1 shows a variation trend of a zero shear viscosity of a colloidal solution along with an alcohol concentration in Example 1 of the present disclosure.

In the 0.1 M CTAB/0.05 M KBr/5 mM to 300 mM cinnamyl alcohol system, it was seen from rheology that in the cinnamyl alcohol system, wormlike micelles were formed in a region where a cinnamyl alcohol concentration was about 50 mM, while no wormlike micelles were formed in the systems of phenethyl alcohol, benzyl alcohol, and anisyl alcohol, and the results were shown in FIG. 1.

Figure 2:
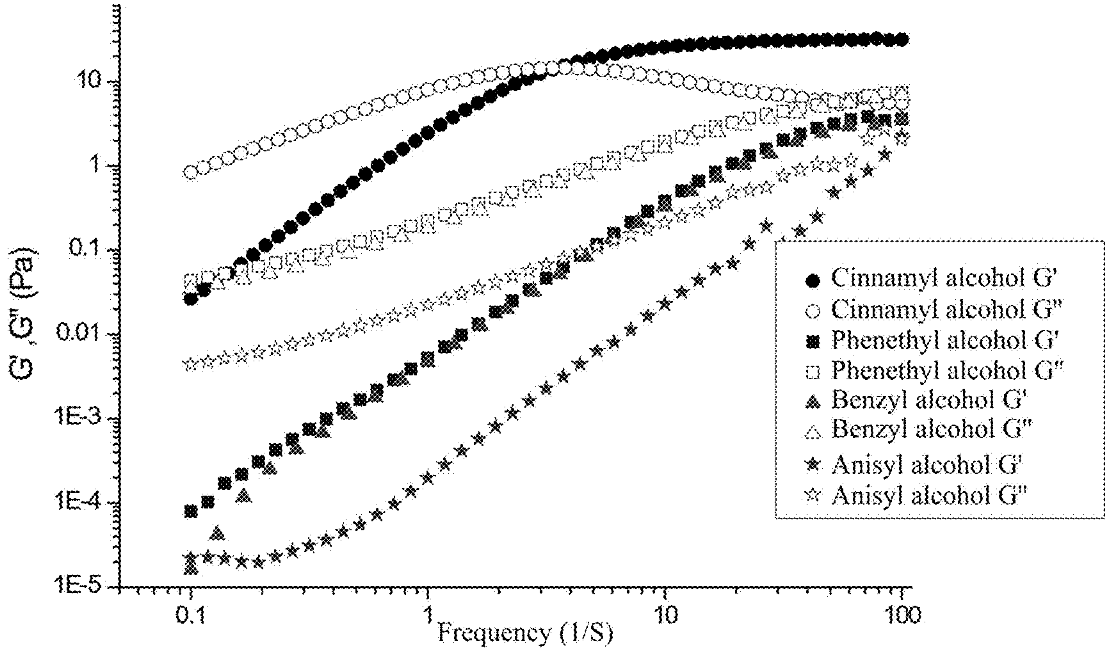
FIG. 2 shows a variation curve of an elastic modulus G' and a viscous modulus G" of the colloidal solution along with an oscillation frequency when alcohol systems are different in Example 1 of the present disclosure.

It was further proved that the cinnamyl alcohol induced transformation of ellipsoid micelles to wormlike micelles in the system. The changes of elastic moduli G' and viscous moduli G" of the 0.1 M CTAB/0.05 M KBr/5 mM to 300 mM perfume alcohol systems at 25° C. were separately investigated along with oscillation frequency. As shown in FIG. 2, the system with wormlike micelles had the viscous modulus G" greater than the elastic modulus G' in the low-frequency region, and the viscous modulus G" less than the elastic modulus G' in the high-frequency region. That is, there was intersection of the curves of G" and G' as a sign of the formation of wormlike micelles. The concentrations of perfume alcohols each were corresponding to a highest point of $\eta_0$ value of each alcohol in FIG. 1, where cinnamyl alcohol was 55 mM, and phenylethyl alcohol, benzyl alcohol, and anisyl alcohol each were 40 mM. It was seen from FIG. 2 that after adding 40 mM of the phenethyl alcohol, 40 mM of the benzyl alcohol, and 40 mM of the anisyl alcohol, the system always exhibited viscosity, showing that the systems with phenethyl alcohol, benzyl alcohol, and anisyl alcohol had no formation of wormlike micelles. However, a dynamic rheological effect of the cinnamyl alcohol showed viscosity at low frequency and elasticity at high frequency, indicating existence of the wormlike micelles.

Figure 3:
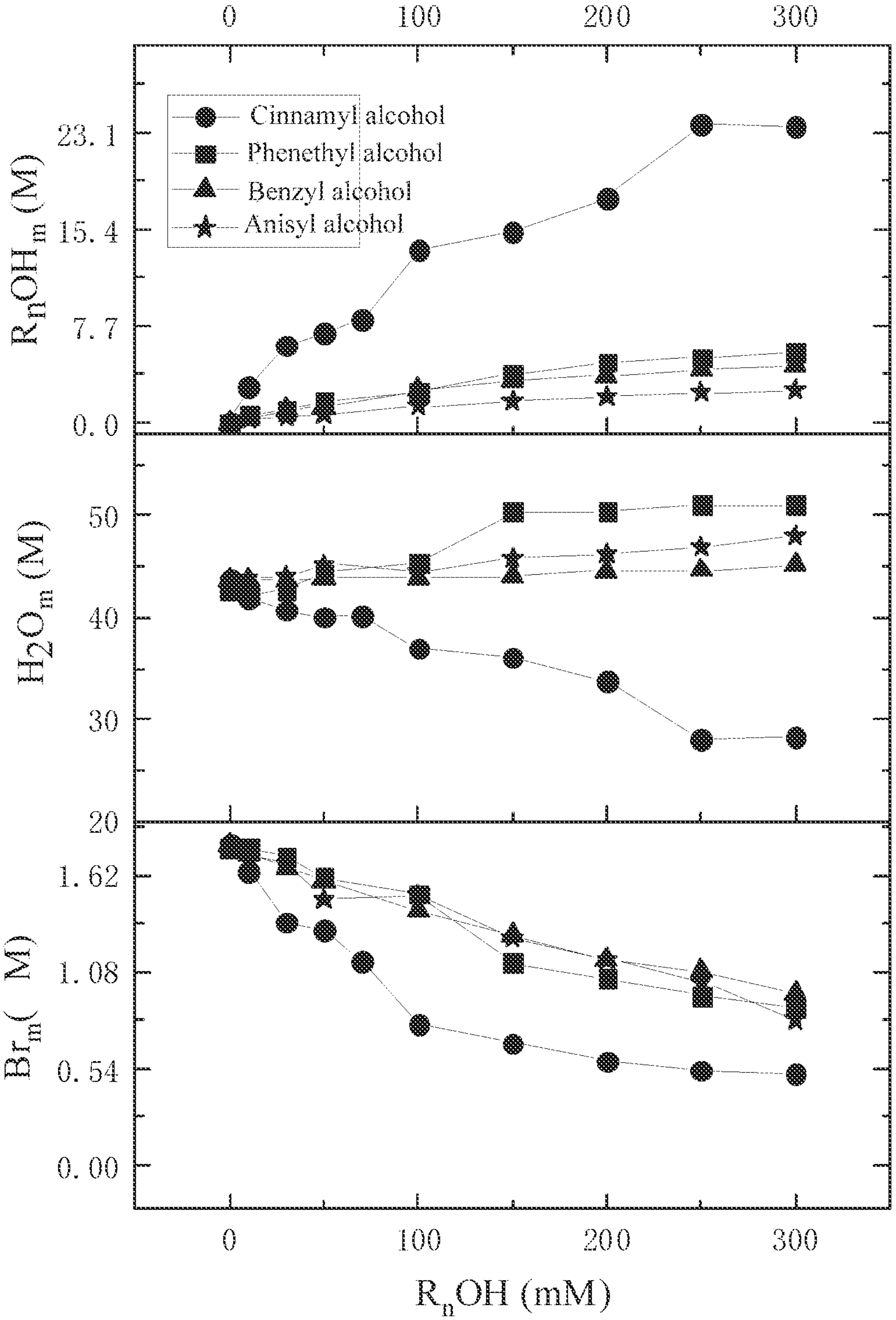
FIG. 3 shows a variation trend of alcohol, water, and bromide ion concentrations along with the alcohol concentration in a micelle interface region in Example 1 of the present disclosure.

The chemical compositions of the micelle interface regions in the above four 0.1 M CTAB/0.05 M KBr/5 mM to 300 mM perfume alcohol systems were detected by chemical probes. The results were shown in FIG. 3. An alcohol concentration was significantly increased at the interface of the cinnamyl alcohol system with wormlike micelles, while changes in the alcohol concentration each were small at interfaces of the other three alcohol systems; meanwhile, a water concentration decreased at the interface of the cinnamyl alcohol system with wormlike micelles, while water concentrations each increased slightly at the interfaces of the other three alcohol systems.

The above descriptions are merely preferred implementations of the present disclosure. It should be noted that a person of ordinary skill in the art may further make several improvements and modifications without departing from the principle of the present disclosure, but such improvements and modifications should be deemed as falling within the protection scope of the present disclosure.

What is claimed is:

1. A detection method of wormlike micelles, wherein the detection method, comprising a step of providing a z-$ArN_2^+$ long-chain probe and a z-$ArN_2^+$ short-chain probe, and the z-$ArN_2^+$ long-chain probe and the z-$ArN_2^+$ short-chain probe have a structure shown in Formula I:

Formula I

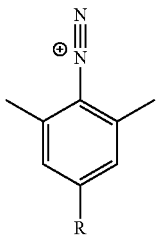

z-$ArN_2^+$ in the z-$ArN_2^+$ short-chain probe, z=1, and R is —$CH_3$; and in the z-$ArN_2^+$ long-chain probe, z=16, and R is —$C_{16}H_{33}$;

the method further comprising the following steps:

(1) preparing the long-chain probe into an acetonitrile stock solution with a concentration of 0.005 M to 0.05 M, and preparing the short-chain probe into an acetonitrile stock solution with a concentration of 0.05 M to 0.5 M;

(2) adding a surfactant to a volumetric flask, dissolving and diluting with a diluent, and adding the stock solution of the long-chain probe obtained in step (1) to obtain a test solution; wherein the test solution has $5\times10^{-4}$ M to $5\times10^{-5}$ M of the long-chain probe and $1\times10^{-3}$ M to 2 M of the surfactant by concentration; wherein in step (2), the surfactant is cetyltrimethylammonium bromide (CTAB);

(3) replacing the surfactant in step (2) with an ammonium salt or a sulfonate, dissolving and diluting with the diluent, and adding the stock solution of the short-chain probe obtained in step (1) to obtain a control solution; wherein the control solution has $5\times10^{-3}$ M to $5\times10^{-4}$ M of the short-chain probe by concentration;

(4) conducting a reaction on the test solution obtained in step (2) at 25° C. to 60° C. for 5 h to 48 h under sealing in the dark, diluting an obtained reaction product with the diluent, and measuring a yield of the product by high-performance liquid chromatography (HPLC);

(5) repeating the operations of step (4) on the control solution obtained in step (3); and (6) obtaining the yield of the product measured by the HPLC from an average of peak areas of three or more repeated injections and calibration curves of cetyldimethylphenol and cetyldimethylbromobenzene.

2. The detection method of wormlike micelles according to claim 1, wherein in steps (2) to (4), the diluent is at least one selected from the group consisting of methanol, acetonitrile, and water.

3. The detection method of wormlike micelles according to claim 1, wherein in step (3), the ammonium salt is at least one selected from the group consisting of tetramethylammonium salt and tetraethylammonium salt, and the sulfonate is methylsulfonate.

4. The detection method of wormlike micelles according to claim 1, wherein the HPLC is conducted by a C18 chromatographic column with a length of 25 cm and using 65% methanol: 35% isopropanol (v/v) as a mobile phase at a flow rate of 0.4 mL/min, a λ of 220 nm, and an injection volume of 100 μL.

* * * * *